United States Patent
Stangl et al.

(10) Patent No.: US 6,764,290 B2
(45) Date of Patent: Jul. 20, 2004

(54) DEVICE FOR FOAMING AROUND A TRANSPARENT PANE FOR A MOTOR VEHICLE ROOF

(75) Inventors: Karl Stangl, Utting (DE); Christian Dünzinger, Mallersdorf-Pfaffenberg (DE); Hans Jurgen Brandner, Dachau (DE); Cord Hermann Hagenmeyer, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 76 days.

(21) Appl. No.: 10/076,100

(22) Filed: Feb. 15, 2002

(65) Prior Publication Data

US 2002/0132022 A1 Sep. 19, 2002

(30) Foreign Application Priority Data

Feb. 16, 2001 (DE) ......................................... 101 07 743

(51) Int. Cl.[7] ............................................. B29C 45/16
(52) U.S. Cl. ...................... 425/116; 264/252; 425/127; 425/190; 425/192 R
(58) Field of Search ........................... 425/190, 192 R, 425/195, 116, 126.1, 127, 125; 264/252

(56) References Cited

U.S. PATENT DOCUMENTS

| | | | | |
|---|---|---|---|---|
| 4,688,752 A | * | 8/1987 | Barteck et al. | 264/252 |
| 5,108,687 A | * | 4/1992 | Jourquin et al. | 425/116 |
| 5,268,183 A | * | 12/1993 | Garza | 425/116 |
| 5,413,748 A | | 5/1995 | Garza | |
| 6,540,499 B2 | * | 4/2003 | Schneider | 425/190 |

FOREIGN PATENT DOCUMENTS

| | | |
|---|---|---|
| DE | 31 12 751 A1 | 10/1982 |
| DE | 198 08 113 A1 | 9/1998 |
| EP | 0 845 340 A2 | 6/1998 |

* cited by examiner

*Primary Examiner*—Tim Heitbrink
(74) *Attorney, Agent, or Firm*—Nixon Peabody LLP; David S. Safran

(57) ABSTRACT

A device for foaming around a transparent pane for a motor vehicle roof, including a top tool having a top shaping structure mounted on a top carrier, and a bottom tool having a bottom shaping structure mounted on a bottom carrier. The shaping structures act as a boundary for the area to be peripherally foamed, and the top tool and the bottom tool are made adjustable relative to one another for inserting or removing the pane and the interchangeable bottom shaping structure. The top shaping structure is also interchangeable to enable matching of the peripheral foaming device to different size and shape panes to be peripherally foamed.

12 Claims, 2 Drawing Sheets

DEVICE FOR FOAMING AROUND A TRANSPARENT PANE FOR A MOTOR VEHICLE ROOF

BACKGROUND OF THE INVENTION

1. Field of the Invention

This invention relates to a device for foaming around a transparent pane of a motor vehicle roof.

2. Description of Related Art

One such generic device is shown in published German Patent Application DE 198 08 113, the top shaping means being located permanently, i.e., not interchangeably, in the device, while the bottom shaping means is made interchangeable in order to enable production of different versions of the motor vehicle roof panes in which the mounting parts are positioned differently, with the same top shaping means. The problem with this known device is that while models of motor vehicle roof panes which differ only slightly, i.e. in the area of the lower shaping means, can be produced with the device, for a completely new model series the entire device must be prepared anew; which is very time consuming and requires a high investment. This is especially a problem when the numbers of items of an individual model series are relatively low.

SUMMARY OF THE INVENTION

The primary object of the invention is to provide a device for foaming around a transparent pane for a motor vehicle roof which enables economic production of motor vehicle roof panes.

This object is achieved in accordance with the invention by a device described hereinbelow. In the inventive approach, there is an advantage because the bottom and top shaping means, which are generally highly product specific, are made interchangeable by means of a modular construction in order that the peripheral foaming device can be adapted to a completely new model series at low cost by merely replacing the corresponding components. This reduces the preparation time for the device, and the tool investment costs for the new model series.

DETAILED DESCRIPTION OF THE INVENTION

Figure 1:
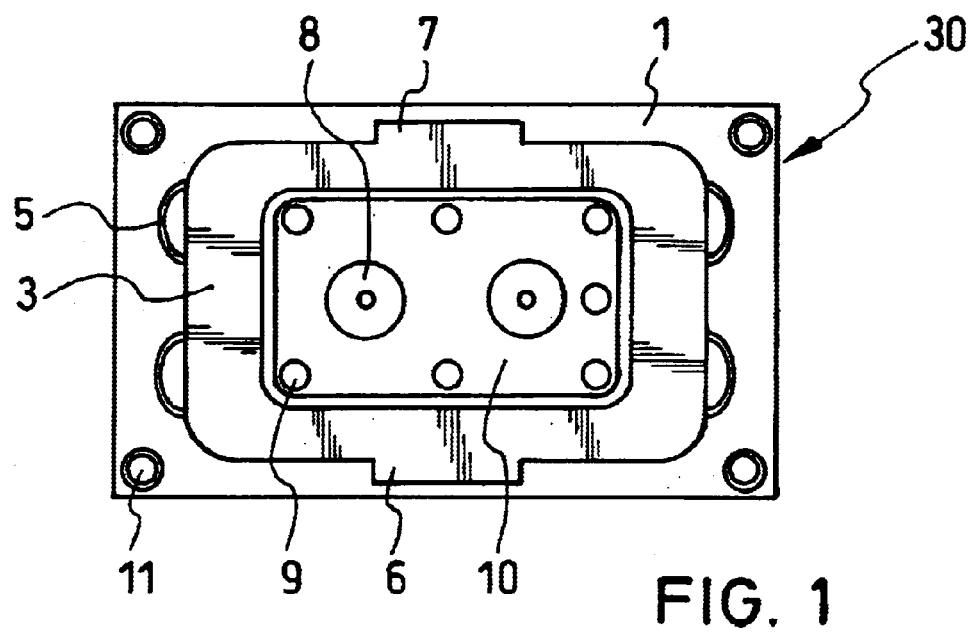
FIG. 1 shows a view of the bottom tool of the device for foaming around a transparent pane for a motor vehicle roof.

According to FIGS. 1 to 4, the bottom tool 30 of the peripheral foaming device 34 comprises a heated base plate 1, on which a bottom shaping ring 3, made for example of steel or aluminum, is mounted. The type of mounting is chosen such that the bottom shaping ring 3 can be easily replaced, that is, handles 5 mounted laterally on the lower shaping ring 3 facilitate replacement of the latter by hand. On the two wide sides of the shaping ring 3 there is one ring enlargement 6 for the gate and one ring enlargement 7 for the lateral waste. The bottom base plate 1 which is made essentially rectangular is provided with tool guides 11 in its edge areas.

The middle area of the base plate 1, which is surrounded by the shaping ring 3, is breached by an opening, in this area there is a raisable ejector bottom 10 which is provided in the edge area with support elements 9 on which the transparent pane 17 to be peripherally foamed is placed. In the middle area of the ejector bottom 10, there are two suction means 8 for positioning and fixing the pane 17.

The pane 17 is a transparent pane for an openable motor vehicle roof, for example, a sliding roof, a sliding and lifting roof, or a spoiler roof, and is preferably a glass pane or plastic pane.

Figure 2:
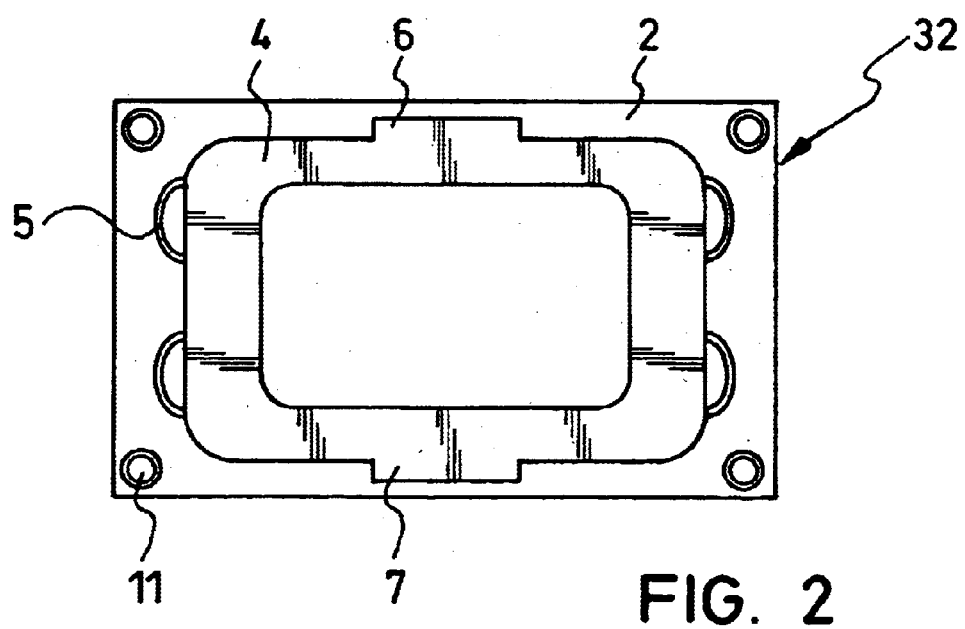
FIG. 2 shows a view of the corresponding top tool from underneath.

As shown in FIG. 2, the top tool 32 comprises a heated top base plate 2 which is essentially rectangular, and in its edge areas is provided with tool guides 11. The top base plate 2 bears a top shaping ring 4 which, analogously to the bottom shaping ring 3, is attached to the top base plate 2 such that it can be easily replaced. To facilitate this replacement handles 5 are provided on the top shaping ring 4. The top shaping ring 4 is likewise for example made of steel or aluminum and on its wide sides has one ring enlargement 6 for the gate and one ring enlargement 7 for the lateral waste.

The top tool 32 and the bottom tool 30 can be adjusted in the vertical direction relative to one another by means of a drive which is not shown and together form the device 34 for foaming around the pane 17.

Figure 4:
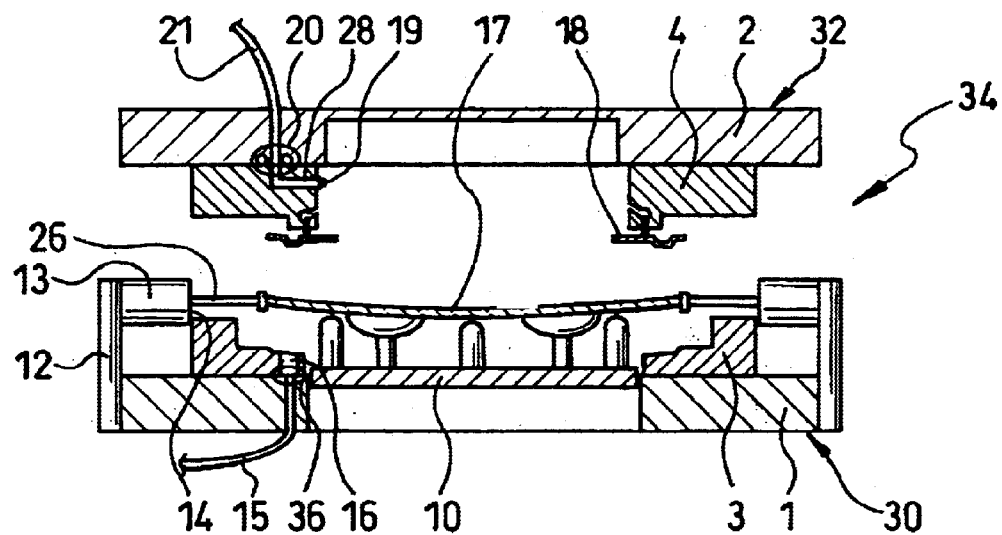
FIG. 4 shows a view similar to FIG. 3, the device however being shown in the opened position.

As shown in FIG. 4, in the opened state of the device, the glass pane 17 is placed on the support elements 9 of the ejector bottom 10 and is centered with respect to the bottom shaping ring 3 by a centering means, which on either narrow side of the bottom shaping ring 3 has a linear motor 13 with path interrogation, and a centering element 26 which can be moved laterally against the pane 17. The linear motor 13 is mounted on the bottom base plate 1 by means of an adjustable mounting 12. Furthermore, the centering means has a stop 14 for the centering element 26. The linear motor 13 is used for adjusting the centering element 26. The centering means is made conventionally, the adjustment path of the centering elements 26 however is selected to be sufficiently large such that panes 17 of different dimensions can be processed in the device 34. After the centering process, the pane is fixed by suction means 8 with respect to the bottom tool 30.

Instead of being provided with a linear motor, the centering means can also be made more economically. In particular, the entire centering means can be made interchangeable in order to enable optimum matching to a wide range of different pane dimensions.

Figure 3:
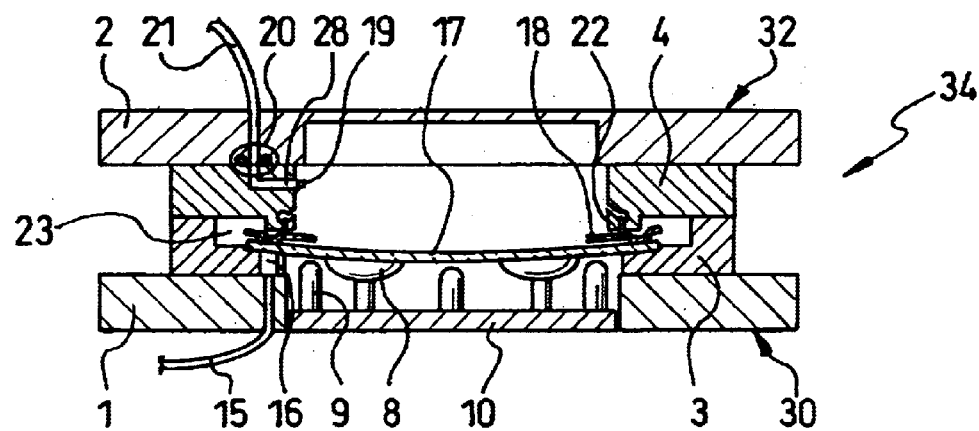
FIG. 3 shows a side view of the device from FIG. 1 of 2 in the closed position.

As shown in FIGS. 3 & 4, the top tool 32 is provided with a media connection 21, for example, for hydraulics, air and electricity, which is guided through the top base plate 2 and leads to a media interface 20 which is formed on the boundary between the top base plate 2 and the top shaping ring 4, in order to enable media supply of the top shaping ring 4. The media interface 20 is made such that when the top shaping ring 4 is replaced, media supply to it can be easily established, for example by means of plug connections. Within the top shaping ring 4 there is a media channel 28 which is connected to the media interface 20 and leads to a connection 19 to which parts-specific elements can be connected, for example a slider for insert parts which can be for example holding angles 18 which are used for attachment of the pane 17 to the cover mechanism in the vehicle. These indicated parts-specific elements are not shown in FIGS. 3 & 4. A fixing element 22 on the top shaping ring 4 can be made as a catch projection in order to fix an insert part (in this example a holding angle 18) on the top shaping ring 4 before the foaming process (see FIG. 4).

After the pane 17, as shown in FIG. 4, has been fixed with reference to the bottom tool 30, and the top tool 32 has been provided with the insert parts (holding angle 18), the top tool 32 is lowered, the top shaping ring 4 and the bottom shaping ring 3 in the edge area of the pane 17 forming a shaping area 23 between themselves. The bottom tool 30 is provided with a vacuum connection 15 which is routed through the lower base plate 1 and is provided with an interface 36 to a vacuum panel 16 which is made in the bottom shaping ring 3. The interface 36 can be made analogously to the media interface 21 of the top tool 32 on the boundary between the lower base plate 1 and the bottom shaping ring 3. If additional media should be necessary for the bottom shaping ring 3, the interface 36 can be modified accordingly. Preferably, the interface 36 is made such that when the bottom shaping ring 3 is replaced, media supply to it can be easily established, for example, by means of a plug connection.

In the peripheral foaming process, the foaming material is introduced into the shaping area 23 by means of a foam feed means which is not shown. Introducing the foaming material into the shaping area 23 is used to provide the peripheral edge area of the pane 17 with a peripheral foaming area and to attach insert parts, such as holding angles 18, to the pane.

After completion of the peripheral foaming process, the peripheral foaming device 34 is opened again by raising the top tool 32 so that the peripherally foamed pane 17 can be removed from the bottom tool 30 by raising the ejector bottom 10.

In the embodiment shown, the bottom shaping ring 3, the top shaping ring 4, the support elements 9 and the stop 14 are made interchangeable in order to enable refitting of the peripheral foaming device 34 for different model series with respect to the pane 17 or the insert parts 18. In this way, it can be ensured that especially the shaping area 23, the insert part fixing 22, the connection 19 for the parts-specific element and the support elements 9 can be matched specifically to a certain model series without the need to prepare a completely new peripheral foaming device 34.

The top and the bottom base plate 1 and 2, the handles 5, the suction elements 8, the ejector bottom 10, the tool guide 11, the centering means with the attachment 12, the linear motor 13 and the centering element 26, the vacuum connection 15, the vacuum panel 16, the media interface 20 and the media connection 21 can equally be made as standard components for all model series.

What is claimed is:

1. A device for foaming an area around the periphery of a transparent pane, which includes a top tool comprising an interchangable top shaping means mounted on a top carrier, and a bottom tool comprising an interchangable bottom shaping means mounted on a bottom carrier, wherein each shaping means acts as a boundary for an area to be peripherally foamed, and the top tool and the bottom tool are adjustable relative to one another to enable insertion or removal of the pane, and wherein the top and bottom shaping means are interchangeable to enable matching of the peripheral foaming device to panes of at least one of different shapes and sizes.

2. The device as set forth in claim 1, further comprising an ejector provided with support elements for the pane, wherein the support elements are interchangeable to enable matching of the foaming device to the panes of at least one of different shapes and sizes.

3. The device as set forth in claim 1, further comprising a means for positioning of parts to be mounted in the area to be peripherally foamed, such that the means for positioning is interchangeable to enable matching of the foaming device to different size parts to be mounted in the area to be peripherally foamed.

4. The device as set forth in claim 3, wherein the means for positioning of the parts to be mounted in the area to be peripherally foamed is at least in part integrated into the top shaping means.

5. The device as set forth in claim 4, wherein the means for positioning of the parts to be mounted in the area to be peripherally foamed further comprises a catch projection.

6. The device as set forth in claim 3, wherein the parts to be mounted in the area to be peripherally foamed are retaining angles for the pane.

7. The device as set forth in claim 1, comprising a centering means for the pane wherein the centering means is capable of centering panes of at least one of different sizes and shapes.

8. The device as set forth in claim 7, wherein the centering means further comprises an interchangeable stop.

9. The device as set forth in claim 1, wherein the area to be peripherally foamed is an edge area of the pane and the top and bottom shaping means are of an annular shape.

10. The device as set forth in claim 9, wherein the top shaping means and the bottom shaping means are each provided with handles to enable manual replacement.

11. The device as set forth in claim 1, further comprising a media interface between the top carrier and the top shaping means to enable media to be supplied to the top shaping means.

12. The device as set forth in claim 1, wherein the bottom shaping means is provided with a vacuum panel connected to a vacuum connection via an interface located between the bottom carrier and the bottom shaping means.

* * * * *